US012752374B2

(12) United States Patent
Heralic et al.

(10) Patent No.: US 12,752,374 B2
(45) Date of Patent: Oct. 6, 2026

(54) CONDUCTANCE BASED CONTROL SYSTEM FOR ADDITIVE MANUFACTURING

(71) Applicant: PROCADA AB, Trollhättan (SE)

(72) Inventors: Almir Heralic, Gothenburg (SE); Petter Hagqvist, Trollhättan (SE)

(73) Assignee: PROCADA AB, Trollhättan (SE)

( * ) Notice: Subject to any disclaimer, the term of this patent is extended or adjusted under 35 U.S.C. 154(b) by 1136 days.

(21) Appl. No.: 17/780,282

(22) PCT Filed: Dec. 3, 2020

(86) PCT No.: PCT/EP2020/084367
§ 371 (c)(1),
(2) Date: May 26, 2022

(87) PCT Pub. No.: WO2021/110793
PCT Pub. Date: Jun. 10, 2021

(65) Prior Publication Data

US 2023/0001514 A1 Jan. 5, 2023

(30) Foreign Application Priority Data

Dec. 4, 2019 (EP) .................................... 19213529

(51) Int. Cl.
*B23K 26/342* (2014.01)
*B23K 5/18* (2006.01)
(Continued)

(52) U.S. Cl.
CPC .............. *B23K 26/342* (2015.10); *B23K 5/18* (2013.01); *B23K 9/04* (2013.01); *B23K 9/125* (2013.01);
(Continued)

(58) Field of Classification Search
CPC ...... B23K 9/1735; B23K 9/0017; B23K 9/09; B23K 9/0953; B23K 2101/18;
(Continued)

(56) References Cited

U.S. PATENT DOCUMENTS 9,700,953 B2 * 7/2017 Flewelling ............ B25J 9/1684
2008/0011728 A1 * 1/2008 Peters ................. B23K 9/1062 219/130.5
(Continued)

OTHER PUBLICATIONS

Hagqvist, P et al., "Resistance based iterative learning control of additive manufacturing with wire", Mechatronics, (20150000), vol. 31, doi:10.1016/j.mechatronics.2015.03.008, pp. 116-123, XP029343741 DOI: http://dx.doi.org/10.1016/j.mechatronics.2015.03.008.
(Continued)

*Primary Examiner* — Chris Q Liu
(74) *Attorney, Agent, or Firm* — DUANE MORRIS LLP; Gregory M. Lefkowitz; Daniel J. Tarr

(57) ABSTRACT

A control system for regulating an additive manufacturing process of an additive manufacturing apparatus, the apparatus configured to add metal to a substrate by means of metal deposition. The apparatus comprises: a nozzle for output of a metal strip, the nozzle configured to be arranged at a distance from the substrate, and configured to move relative the substrate in XYZ-axes via a position actuator. The apparatus further comprises a heat source configured to melt the metal strip into a weld pool on the substrate, and an electrical power source configured to supply current via the metal strip 20 to the substrate. The control system is configured maintain process stability, during the deposition of a layer of metal, via: determining electrical conductance between the metal strip and the substrate by measuring at least one electrical property of the supplied current; determining the difference between the determined electrical conductance, and a desired electrical conductance; and,
(Continued)

adjusting at least one of: the substrate to nozzle distance, the speed of the nozzle movement relative the substrate, the amount of supplied current, the heat provided by the heat source, and/or the rate of output of the metal strip, based on the difference between the determined conductance and the desired conductance.

19 Claims, 4 Drawing Sheets

(51) Int. Cl.

*B23K 9/04* (2006.01)
*B23K 9/12* (2006.01)
*B23K 10/02* (2006.01)
*B23K 11/00* (2006.01)
*B23K 15/00* (2006.01)
*B33Y 10/00* (2015.01)
*B33Y 30/00* (2015.01)
*B33Y 50/02* (2015.01)

(52) U.S. Cl.

CPC ............ *B23K 9/126* (2013.01); *B23K 10/027* (2013.01); *B23K 11/0013* (2013.01); *B23K 15/0086* (2013.01); *B33Y 10/00* (2014.12); *B33Y 30/00* (2014.12); *B33Y 50/02* (2014.12)

(58) Field of Classification Search

CPC ............ B23K 2101/28; B23K 26/0604; B23K 26/0676; B23K 26/242; B23K 26/348; B23K 28/02; B23K 31/12; B23K 9/025; B23K 9/092; B23K 9/093; B23K 9/0956; B23K 9/10; B23K 9/1006; B23K 9/1043; B23K 9/1062; B23K 9/1068; B23K 9/121; B23K 9/28; B23K 9/323

USPC .............. 219/130.1, 130.51, 121.63, 121.64, 219/130.21, 130.5

See application file for complete search history.

(56) References Cited

U.S. PATENT DOCUMENTS

| | | | | |
|---|---|---|---|---|
| 2008/0245781 | A1* | 10/2008 | Wilhelm | B23K 9/1735 219/130.51 |
| 2010/0213179 | A1* | 8/2010 | Peters | B23K 26/348 219/121.64 |
| 2015/0076128 | A1* | 3/2015 | Marchione | B23K 37/0408 219/130.21 |
| 2015/0183045 | A1* | 7/2015 | Peters | B23K 35/0261 219/130.21 |
| 2015/0343551 | A1 | 12/2015 | Davidson et al. | |
| 2019/0160530 | A1* | 5/2019 | Peters | B23K 26/342 |
| 2019/0366466 | A1* | 12/2019 | Hutchison | B23K 9/04 |
| 2020/0215636 | A1* | 7/2020 | Smith | B23K 9/0734 |
| 2020/0398363 | A1* | 12/2020 | Liu | B23K 9/0953 |
| 2021/0308796 | A1* | 10/2021 | Morita | B23K 26/1464 |

OTHER PUBLICATIONS

Hagqvist, P et al., "Resistance measurements for control of laser metal wire deposition", Optics and Lasers in Engineering, (20140000), vol. 54, pp. 62-67 DOI: http://dx.doi.org/10.1016/j.optlaseng.2013.10.010.

* cited by examiner

Fig. 1
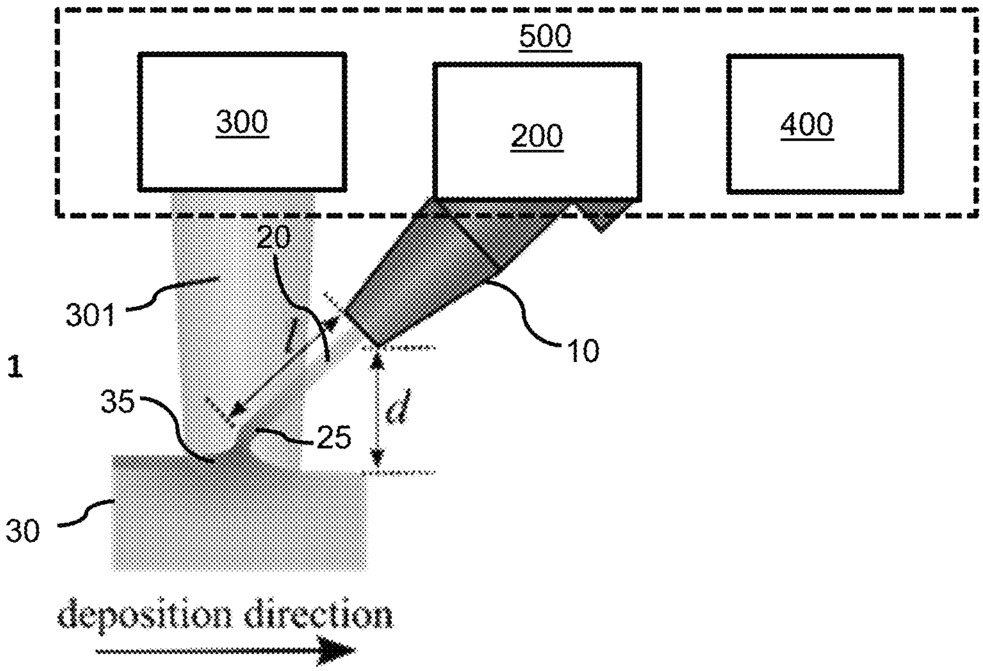
Fig. 2a
Fig. 2b
Fig. 2c
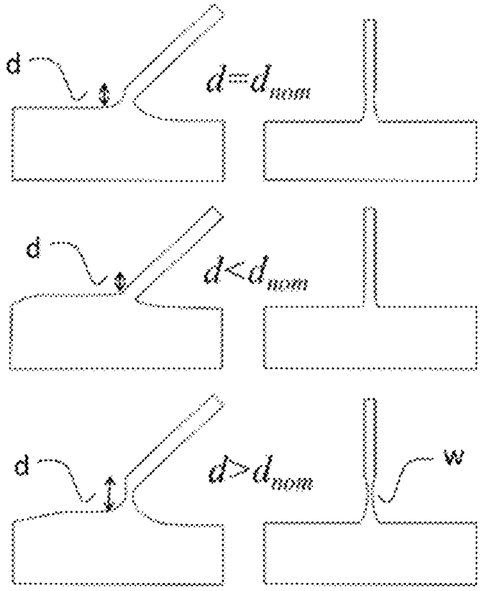

CONDUCTANCE BASED CONTROL SYSTEM FOR ADDITIVE MANUFACTURING

CROSS-REFERENCE TO RELATED APPLICATIONS

This application is a § 371 national stage entry of International Application No. PCT/EP2020/084367, filed Dec. 3, 2020, which claims priority to European Patent Application No. 19213529.1, filed Dec. 4, 2019, the entire contents of which are incorporated herein by reference.

FIELD OF THE INVENTION

The inventive concept described herein, generally relates to a control system for controlling an additive manufacturing process. The control system determines and controls based on the difference between the measured and desired, nominal, conductance.

BACKGROUND OF THE INVENTION

The process of metal additive manufacturing is a technique in which a heat source, for instance a laser, is used to melt metal wire into a metal deposit. It can thus be described as a metal printer. Other terms used for the technology are namely, laser metal deposition, and directed energy deposition. Since this technique can offer the production of products with complex geometries with a high throughput with minimal wastage of expensive raw material, it is advantageous in many industries, for instance in the aerospace industry.

In general, the principle of this process can be described as a high-power laser creating a pool of molten metal on a workpiece or substrate, into which the wire is fed. The high temperature of the weld pool and the laser radiation heats up the wire and causes it to melt. The wire feeder is, together with the laser optics, attached to a processing tool which is moved along a deposition path by an industrial robot. This causes the molten wire to solidify along this deposition path, forming beads. These beads are placed side-by-side and layer-upon-layer, forming 3D structures upon the substrate using suitable robot movements. This process however is highly sensitive to disturbances and exhibits non-linear behaviour in terms of deposit geometries and input parameters. Positioning of the tool relative to the substrate and the wire feed rate is essential in maintaining a stable deposition process. If the distance between the tool and the workpiece is adequate, a continuous transition of material from the solid wire into the weld pool will occur. If the distance is too large, a neck will form in the material transfer, which is essentially a weak link. In case the distance increases further, this neck may become disrupted, in which case the wire will be molten independently of the substrate. A droplet will build up at the wire tip, before it eventually grows too large to be sustained by surface tension and falls down onto the substrate. This droplet transfer will give an uneven surface, poorly suited for further deposition. If the distance is too small, the wire will protrude through the weld pool into the solid substrate, which is referred to as "stubbing". This will cause the wire to rapidly oscillate from side to side, scraping onto the unmolten part of the substrate, causing lack-of-fusion defects in the deposited material. Disturbances in distance may be caused by process variations due to deposit geometry, temperature accumulation or poor planning of deposition paths.

Furthermore, additional output parameters in a deposition process may cause disturbances in the process, leading to a reduced process stability or performance.

In either case, it is essential to have good control on the distance of the wire tip and the weld pool on the substrate. In this regard, GB2551163A discloses a laser metal deposition with wire apparatus and associated process with a laser configured to melt a wire, a nozzle configured to extrude the wire, a DC current source configured to supply current through the extruded wire into a substrate; and a wheatstone bridge, wherein the resistance between the nozzle and the substrate forms one resistance Rx of the wheatstone bridge, and wherein the remainder of the wheatstone bridge is supplied by an AC voltage source isolated from the DC current source by capacitors C and/or a band-pass filter F. The apparatus enables the combination of thermoelectric resistance heating and the in-situ measurement of the resistance of the nozzle to weld-pool to substrate to determine the distance between the tool and substrate surface.

Hagqvist, P et al, *Resistance based iterative learning control of additive manufacturing with wire*. Mechatronics. 31 (2015) 116-123 describes an iterative, feed-forward, control process and system for an additive manufacturing process. The feed-forward control process uses measured resistance data which is gathered during deposition of a single layer, after deposition of a layer, and prior to deposition of a subsequent layer the measured resistance data is filtered and fed to a resistance-to-distance regression model. The system is purely feed-forward of distance and cannot be used for feedback control during deposition of a layer. According to the system of Hagqvist, 2015, measured resistance data is less suitable for feedback control due, at least in part, to the noisy resistance signal which results in either actuation errors or necessitates low-pass filtering and hence increased time lag, or poor high frequency response of the control loop.

Hagqvist, P et al, *Resistance measurements for control of laser metal wire deposition*. Optics and Lasers in Engineering. 54 (2014) 62-67 describes a method for controlling laser metal wire deposition on-line (during deposition of a single layer), based on a resistance model for determining distance of the tip from the workpiece based on the resistance. As opposed to Hagqvist (2015), the Hagqvist (2014) feedback system is a feedback controller, however, filtering of the resistance signal is mandatory, increasing the necessary processing requirements for the system, and the controller, as it is based only on determining distance from the wire tip to the workpiece, only controls this distance and other process parameters remain uncontrollable.

The relation between resistance and distance is rather complex, and depends on many parameters such as the position of the wire tip, the temperature, the area etc. Additionally, there is often a high demand on both speed and accuracy to fulfil the requirements put on the manufacturing. Furthermore, there are additional parameters in a process besides distance which may affect process stability and performance. Therefore, there is a need for a better control of the manufacturing process.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a control system for regulating an additive manufacturing process of an additive manufacturing apparatus, the apparatus configured to add metal to a substrate by means of metal deposition. The apparatus comprises: a nozzle for output of a metal strip, the nozzle is configured to be arranged at a distance from the substrate, and configured to move relative the substrate in XYZ-axes via a position actuator. The apparatus further comprises a heat source configured to melt the metal strip into a weld pool on the substrate, and an electrical power source configured to supply current via the metal strip to the substrate. The control system is configured maintain process stability, during the deposition of a layer of metal, via: determining electrical conductance between the metal strip and the substrate by measuring at least one electrical property of the supplied current; determining the difference between the determined electrical conductance, and a desired electrical conductance; and, adjusting at least one of: the substrate to nozzle distance, the speed of the nozzle movement relative the substrate, the amount of supplied current, the heat provided by the heat source, and/or the rate of output of the metal strip, based on the difference between the determined conductance and the desired conductance.

The process has the advantage that control of numerous process parameters is possible. Furthermore, there is no need for computationally complex empirical regression models from resistance-to-distance.

A process for controlling an additive manufacturing process is also provided.

An additive manufacturing apparatus comprising a control system is provided.

Further advantageous embodiments are disclosed in the appended and dependent patent claims.

BRIEF DESCRIPTION OF THE DRAWINGS

These and other aspects, features and advantages of which the invention is capable will be apparent and elucidated from the following description of embodiments of the present invention, reference being made to the accompanying drawings, in which FIG. 1 is a schematical illustration of a deposition system, including a control system according to an aspect.

FIGS. 2*a-c* schematically demonstrate three different exemplifying scenarios of the additive manufacturing for different distances between the nozzle and the substrate according to an aspect.

DETAILED DESCRIPTION

Figure 3A:
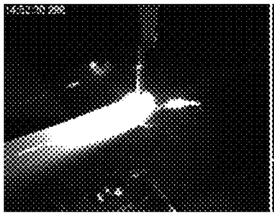
FIGS. 3*a-g* are frames from a recorded additive manufacturing process lacking multi-parameter output control whereby a metal drop forms distal the substrate and clogs the nozzle.
Figure 3B:
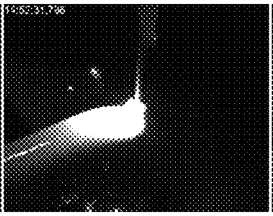
Figure 3C:
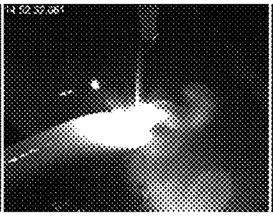
Figure 3D:
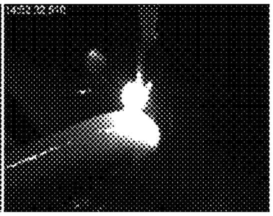
Figure 3E:
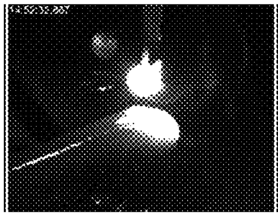
Figure 3F:
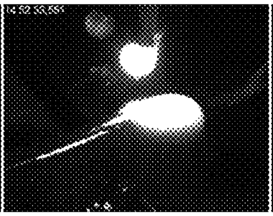
Figure 3G:
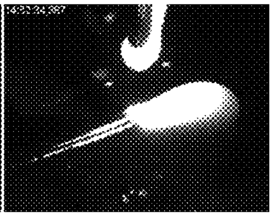

The following description of the present invention describes a control system 500 for an additive manufacturing process, an additive manufacturing system and a method for controlling an additive manufacturing system. The control system 500 maintains system performance by maintaining a nominal conductance. The additive manufacturing apparatus controllable via the control system 500 is configured to add metal to a substrate 30 by means of metal deposition. The apparatus comprises a nozzle 10 for output of the metal strip 20, a heat source 300 configured to melt the metal strip 20 via provision of heat 301, an electrical power source 400 configured to supply current via the metal strip 20 to the substrate 30. The control system 500 maintains process stability via: determining the electrical conductance between the metal strip 20 and the substrate 30, determining the difference between the determined conductance and a desired, nominal electrical conductance, adjusting an output process parameter such that the nominal electrical conductance is maintained. The apparatus is preferably a laser metal wire deposition (LMD-w) apparatus. The output parameter is at least one of: the substrate 30 to nozzle 10 distance, the speed of the nozzle 10 movement relative the substrate 30, the amount of supplied current, the heat 301 provided by the heat source 300, and/or the rate of output of the metal strip 20.

The inventors have identified that general process stability has a linear relation to conductance. General process stability as used herein refers to the general performance, and robustness of the additive manufacturing process. A stable process is a process which avoids the molten wire forming distal the substrate 30, that is, melting elsewhere than the weld pool 35 and potentially causing a catastrophic process failure as the nozzle 10 becomes filled with molten metal; "stubbing" as described previously; overheating of the substrate 30; and other determinantal process conditions.

The linear relationship between general process stability and conductance enables the use of a relatively simple controller. For example, a traditional Proportional, Integral, Derivative (P, PI, or PID) feedback controller may be used to control an additive manufacturing process via the control system 500. The conductance based control system 500 need not be based exclusively on a P, PI, or PID control system. For example, the control system 500 may use one or several alternative control techniques to implement conductance based control. For example, bang-bang control may be used to control an output parameter, or several parameters. Bang-bang control may be especially suitable for controlling the heat 301 provided by the heat source. For example, the heat 301 provided by the heat source may be controlled by turning the heat source 300 on/off to adjust the heat provided. The control system 500 may be based on sliding mode control. The control system 500 may combine several known control techniques to control several output parameters. The control system 500 may control each of the output parameters with a different control technique. Whilst different specific control implementations have been described, the control system 500 as described herein is a conductance feedback control system 500 which can control an additive manufacturing process during deposition of a layer to maintain a nominal conductance.

The control system 500 is an online feedback system where measurement of conductance, determining the difference between the measured conductance, and the desired, nominal, conductance occurs at a high rate. The high rate is dependent on the specific implementing device(s) used within the system but may range from several times per second, to several hundred times per second, or higher. The system may therefore be considered continuous, as opposed to previous systems there is no need for scanning of the workpiece surface, no collation of errors or disturbances after a layer has been deposited etc.

FIG. 1 shows a schematic representation of a deposition system showing a substrate 30 and a metal strip 20 extending from a nozzle 10. The tip 25 of the metal strip 20 is heated by a heat 301 from a heat source 300 and forms a weld pool 35 on the surface of the substrate 30. The nozzle 10 to substrate 30 distance is defined as d, the length of the strip 20 extending from the nozzle 10 is defined as l.

FIGS. 2*a-c* show schematic representations of deposition systems where the nozzle 10, metal strip 20, and metal strip tip 25 are at different heights, d, from the surface of the substrate 30. FIG. 2*a* shows a nominally stable system where the height of the tip 25 is at $d_{nom}$, an optimal distance, from the substrate 30. FIG. 2*a* represents an ideal condition where the weld pool 35 forms as desired on the surface of the substrate 30. In FIG. 2*b* the distance is smaller than the optimal distance and stubbing occurs (as described in the Background section). In FIG. 2*c* the distance is greater than the optimal distance, $d_{nom}$, and therefore a weak link W is formed.

The present control system 500 is designed to adjust, based on the measured conductance, the process parameters such that the disadvantageous conditions shown in FIGS. 2*b* and 2*c* are avoided.

As described in the background section, previous control systems, both feed forward control systems, and feedback control systems have been based on providing a resistance to distance model, and thereafter controlling the distance of the nozzle 10 from the substrate 30 based on the measured resistance.

The distance of the metal strip tip 25 from the weld pool 35 or substrate 30 is not modelled specifically, and need not necessarily be the output of the control system 500. That is, the controller may control other process parameters in addition to, or instead of, the distance of the wire tip from the weld pool 35 based on the measured conductance to maintain process stability. The control system 500 may for example, control the speed of the nozzle 10 movement relative the substrate 30, the amount of current supplied to the metal strip 20, the heat 301 supplied by the heat source 300, and/or the rate of output of the metal strip 20. Each, or a combination of the above process parameters may be maintained via a conductance based feedback control system 500.

Further describing FIG. 1, the nozzle 10 is held at a nozzle 10 to substrate 30 distance d above a substrate 30, and the nozzle 10 to substrate 30 distance is orthogonal to the deposition direction, which is indicated by an arrow in FIG. 1. A wire strip 20 is fed to the nozzle 10 and is extruded from an end so that the metal strip 20 tip 25 comes into close proximity to the substrate 30 or such that it has physical contact with the substrate 30. In the embodiment depicted in FIG. 1, the heat source 300 is a laser, from which a laser beam 301 is directed towards the protruding tip 25 of the metal strip 20 and the substrate 30. The laser beam 301 melts the metal strip 20 into a melt pool 35 on the substrate 30. The nozzle 10, and simultaneously the laser beam 40 are moved in the deposition direction at a controllable rate. In addition to being moved in the deposition direction, the nozzle 10 can be moved up or down along the axial direction, so to adjust the nozzle 10 to substrate 30 distance d of the wire tip 25 in response to measured conductance input provided by the control system. An electrical power source 400 establishes a current via metal strip 20 into the substrate 30. In the above description the distance d is the distance of the wire tip 25 from the substrate 30. As the length of wire extending from the nozzle 10 is generally known d could also be considered to be the distance of the nozzle 10 from the substrate 30 in some aspects.

The present inventors have identified that controlling for conductance, and via maintaining a nominal conductance, a control system 500 is provided which can control additional output parameters and maintain process stability, in addition to the parameter of wire tip 25 to substrate 30 distance.

The control system 500, which may be described as a multi-output-parameter conductance based feedback control system comprises an additive manufacturing apparatus which is configured to add metal to a substrate 30 by means of metal deposition. The apparatus comprises a nozzle 10 for output of the metal strip 20, a heat source 300 configured to melt the metal strip 20 into a weld pool 35 on the substrate 30, and an electrical power source configured to supply current via the metal strip 20 to the substrate 30. The control system 500 determines electrical conductance between the metal strip 20 and the substrate 30. Thereafter the control system 500 compares the conductance with a nominal conductance. The control system 500 thereafter adjusts at least one of the substrate 30 to nozzle 10 distance, the speed of nozzle 10 movement relative the substrate 30, the amount of supplied current, the heat provided by the heat source 300, the rate of the output of the metal strip 20 based on the difference between the determined conductance and the nominal conductance. The system is thereby controlled via maintaining a nominal conductance during the additive manufacturing process. The control system 500 need not determine the distance of the metal strip 20 from the substrate 30 and therefore complex regression models are not necessary to be implemented within the control system 500.

The multi-output-parameter feedback control system 500 based on conductance is an improved system compared to the control system based on resistance to distance as described above as it can control multiple process parameters based on conductance alone and no modelling of distance as a function of the electrical property is required.

The additive manufacturing apparatus comprises, as described, a nozzle 10 for output of a metal strip 20 and at least one position actuator 200 for displacing the nozzle 10 relative the substrate 30. The nozzle 10 may be displaced via the position actuator 200 in XYZ-axes relative the substrate 30. That is, the position actuator 200 may displace the nozzle 10 in XY-axes along the length and width of the substrate 30. The position actuator 200 controls the position of the nozzle 10 in a height axis, Z-axis, toward and away from the substrate 30. The Z-axis is generally an axis perpendicular to the deposition direction.

The position actuator 200 may be any one or combination of the following: single axis linear actuator, industrial robot, gantry systems, orbital welding system, Stewart platform, or a custom made position actuator 200. The position actuator 200 preferably comprises a combination of a lower resolution actuating component capable of multi-axis movement such as a robot and a higher resolution single-axis actuating component such as a linear actuator. Such a position actuator enables for both fast and accurate movement of the nozzle 10 with respect to the substrate 30.

The position actuator 200 adjusts the position of the nozzle 10, including the protruding tip of the metal strip 20 relative to the substrate 30. The bandwidth of the actuator may preferably be significantly greater than the variations in the surface profile of the substrate 30. By this it is meant that, the position actuator 200 shall preferably be able to adjust the axial position of the nozzle 10, or alternatively feedstock material tip 25 in a larger amplitude than the topological variations of the substrate 30 surface so to avoid physical encounter of the nozzle 10 with the substrate 30 surface, and so the metal strip 20 tip may be moved up and down along the axial direction with high velocity and be able to follow the profile of the substrate 30. The bandwidth of the actuator 200 as described above also includes the traverse, XY-axis, speed of the actuator 200 and therefore the nozzle 10 relative the substrate 30.

The position actuator 200 may be a robot arm, for example, the position actuator may be a 6-axis robot arm. The nozzle 10 is positioned at the distal end of the robot arm. The heat source 300 provides the required heat 301 for melting the metal strip 20.

The heat source 300 may be for example, an electric arc, a plasma, resistive heating, inductive heating, flame, a laser, or alternatively an electron beam. In the latter two examples, the electron or laser beam may be directed towards the substrate 30 and the extruded wire strip, so to melt the two into a melt pool on the substrate 30. In the experimental examples below the heat source 300 is a laser beam.

The electrical power for establishing a current between the metal strip 20 and the substrate 30 may be provided by a battery source, or alternatively by a welding source. Alternatively, other sources such as an AC voltage source, a DC voltage source, voltage regulated source, a current regulated source, or any other alternative electrical source may provide the required electrical power.

The control system 500 determines the conductance between the substrate 30 and the metal strip 20.

The conductance may be determined by measuring an electrical potential at a first position, such as the nozzle 10, the feedstock actuator 200, and/or a contact point on the metal strip 20 at a distance from the substrate 30; and an electrical potential at a second point such as the substrate 30 or ground. There may be a potential difference between the unmolten wire strip and the substrate 30. In this case, the measurement may be carried out between any conducting object which is in contact with a point of the metal strip 20.

The control system 500 may determine conductance by measuring the current between the power source and at least one of: the wire strip 20, the substrate 30, and/or ground. The current sensor may be a Rogowski coil, current transformer, Hall effect sensor, flux-gate sensor, magneto-resistive sensor, and a shunt resistor or a combination thereof.

In a control system 500 where a shunt resistor is used to measure current the shunt resistor is placed in series with the process, that is in series with the metal strip 20 and the substrate 30. By measuring the voltage over the well-defined resistance of the shunt resistor the current through process, that is, the current between the substrate 30 and the metal strip 20 may be determined.

In some aspects, the measured current may be filtered or processed. This adds processing complexity to the system but the added complexity may enable improved control in some aspects. The signal processing may comprise filtering, the filtering may comprise low-pass filtering, band-pass filtering, notch filtering, or non-linear filtering, or a combination of these filtering processes.

The signal filtering may be carried out by averaging. Additionally or alternatively, the signal processing may be carried out by artificial intelligence signal processing. The signal processing may be implemented in for instance at least one DSP, FPGA, Micro controller, SoC, single board computer, PLC, or PC, or in a combination of the same. The filtering of the signal may be implemented by an analogue component or components.

The control system may comprise a measurement module. The control system may comprise a processing module.

The measurement of the electrical property may be performed by a measurement module. That is, the measurement of conductance may be performed by a measurement module which comprises, for example, the current sensor. The measurement module may distribute the measured conductance to a controller of the control system 500.

The filtering of the conductance signal may be performed by the processing module. That is the implementation of the filtering described above may be performed by a processing module.

An advantage of having a separate measurement module, and/or a separate processing module is that it allows the addition of processing power to the system if they are implemented in separate modules. The measurement and/or filtering need not be performed by the same processor as that which outputs processing parameters to the controlled devices of the system 500.

However, the control system 500, or an additive manufacturing system may be described as comprising the aspects for measuring the electrical property themselves, that is, measurement module and processing module are terms used to describe the current measuring and filtering implementation and architecture in the system, but the architecture does not necessarily effect the control system performance.

The feedstock material being the metal strip 20, may be a metal wire, such as a solid wire or alternatively a cored wire. Alternatively, the metal strip 20 may be a metal band, or any other metallic geometry that has a high aspect ratio, or expressed differently, its end diameter may be small compared to its length.

The feedstock actuator may then be a wire feeder, or alternatively in the case of a metal band, a band feeder.

The nominal, desired, conductance value may be determined experimentally. That is, a process may be performed whereby the conductance is measured continuously, or sample, and thereafter the process is analysed to determine the conductance when the process was optimal. For example, a trial layer may be deposited. During the deposition of the trial layer, the conductance is measured. The measured conductance is compared to process stability. The nominal conductance may be the measured conductance value when the process was determined to be stable, ideal etc. The nominal, desired, conductance, may be determined via simulations. The control system 500 and the additive manufacturing system may be modelled and a simulation performed which defines a nominal, desired, conductance. The nominal conductance may also be considered a target conductance. The term nominal as used herein refers to the fact that a specific conductance value may be determined for each specific system and process and depend on such parameters as the heat source 300, the material of the substrate 30, the desired deposition rate etc.

The control system 500 may comprise a known controller implementation such as a P-, PI-, or PID, bang-bang, sliding mode, excitation signal etc. controller. The controller may be implemented by various devices known in the art. The controller may be implemented via a FPGA, microcontroller, SoC, single board computer, PLC or a PC, or a combination thereof. The control system 500 receives an input signal comprising at least the measured conductance.

Figure 6:
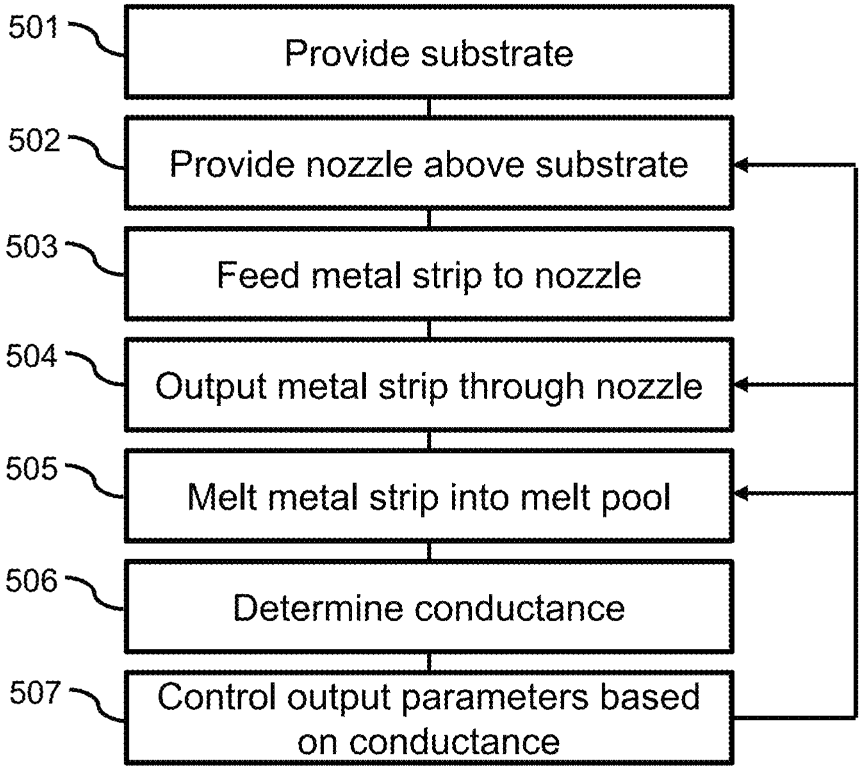
FIG. 6 is a schematic diagram of an additive manufacturing process comprising a control system according to an aspect.

FIG. 6 is a schematic diagram of the main steps for performing an additive manufacturing process using the conductance based control system 500 of the present invention. In 501 a substrate 30 is provided. The substrate 30 is, as described previously, the surface upon which the additive manufacturing process will be performed. In 502 the nozzle 10 for output of the wire strip is provided above the substrate 30. As described previously, the nozzle 10 may be positioned by a robot actuator, such as a standard 6-axis robot arm. The nozzle 10 may be positioned, in addition to via a robot actuator via a linear actuator at the end of the robot arm. The linear actuator may be used for accurate positioning of the nozzle 10 relative the substrate 30 than the positioning possible with the robot actuator. In 503 the metal strip 20 is fed to the nozzle 10. In 504 the metal strip 20 is output from the nozzle 10, that is, a stock of material is fed through the nozzle 10, from within the nozzle 10 to outside the nozzle 10. The deposition process is thereafter initiated in 505 where the metal strip 20 is melted to form a melt pool, or, after the process has been initiated into the melt pool. The melting of the metal strip 20 is, in an LMD-w system and process performed via a laser heat source 300. In some instances, additional or alternative heating may occur via the provision of a current through the metal wire such that the metal wire is melted. In 506 the conductance between the melting metal strip 20 and the substrate 30 is determined. The conductance may be determined via measuring the current through, and the voltage difference between, the metal strip 20 and the substrate 30. To determine the conductance an electrical power source is configured to provide a current via the metal strip 20 to the substrate 30. The measured conductance determined in 506 may thereafter be used to control the process parameters in 507. The process parameters controllable via maintaining a nominal conductance may be the nozzle 10 to substrate 30 distance, that is, the position of the robot arm, the linear actuator, or both; the speed of the nozzle 10 movement relative the substrate 30, that is, the speed of movement of the robot arm relative the substrate 30; the amount of current supplied to the metal strip 20 via the electrical power source; the heat provided by the heat source 300, that is, in the case of an LMD-w system, the laser output power; and/or the rate of output of the metal strip 20 from the nozzle 10.

Figure 7:
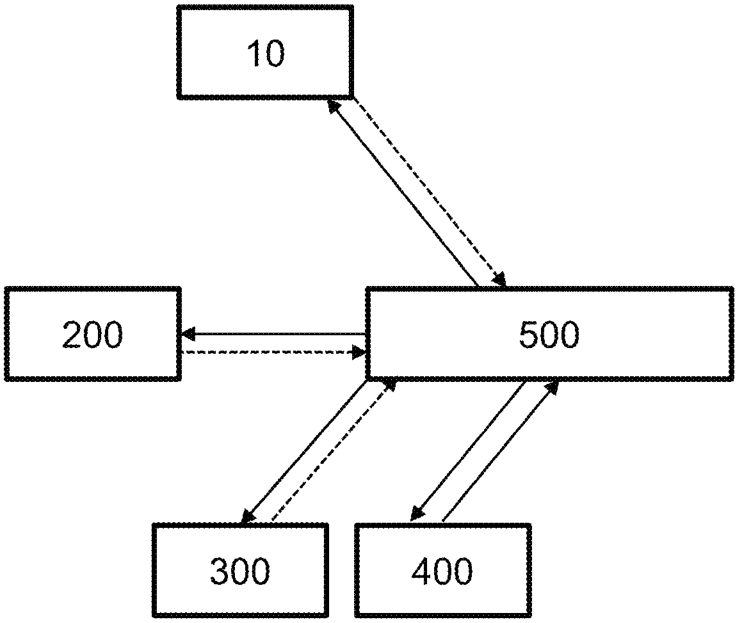
FIG. 7 is a block diagram showing different aspects of an additive manufacturing system.

FIG. 7 is a block diagram showing different components of an additive manufacturing system. Block 10 is the nozzle 10 comprising a feedstock actuator for feeding metal strip 20. Block 200 is the position actuator 200, for moving the nozzle 10, including the feedstock actuator. As described previously, the position actuator 200 may comprise a robot arm and a linear actuator. Block 300 is the heat source 300, in a LMD-w system a laser heat source 300, which melts the metal strip 20 fed from the feedstock actuator. Block 400 is the electrical power source which supplies a current between the metal strip 20 and the substrate 30 and enables measurement of the conductance between the metal strip 20 and the substrate 30. Block 500 is the control system 500, or controller. The control system 500 may receive input signals from each of the components, or it may only receive an input signal from the electrical power source, that is the measured conductance. The optional signals are shown with dotted lines. The control system 500 determines the difference between the measured conductance and the nominal, desired, conductance, and outputs signals to the system components. The control system 500 may receive input signals from all of the system components or some subset, or only the electrical power source, that is the measured conductance. It may output controlling signals to all of the system components or some sub set.

To determine the conductance, at least one electrical property of the additive manufacturing process is determined e.g. by measuring a potential difference across the metal strip 20, and the electrical property (e.g. a voltage difference) is processed by a control unit, for example, a controller.

Preferably, as described previously, the system is designed to control several aspects of the additive manufacturing process. In such a control system the controller need not convert the conductance to the distance $d_{calc}$ but rather perform control based on the difference between the measured conductance and a desired, nominal, conductance. The control system 500 delivers input based on the at least one electrical property, for example conductance to the electrical power source, the heat source 300, the feedstock actuator, the linear actuator and/or the robot arm, which in turn are adjusted based on this input in order to gain the optimal metal deposition.

According to one exemplifying embodiment, the control system 500 measures one or more electrical properties of the additive manufacturing process, calculates conductance based on the one or more measured electrical properties, and adjusts the conductance via input to the corresponding components of the additive manufacturing apparatus.

In more detail, when calculating the conductance, the voltage and/or the current is measured while the additive manufacturing process is taking place. It may be that conductance is first calculated though the measured voltage and current signals, and later processed, or alternatively, the measured current and voltage signals are processed before calculating conductance. As the conductance has a linear relation to process stability, this linear approximation will allow for controlling the distance, the applied heat, the current through the metal strip 20, the speed of movement of the nozzle 10 relative the substrate 30, and the metal strip 20 output rate, or a combination thereof, based on the measured conductance.

EXPERIMENTAL SECTION

Experiment 1: LMD-w with Nominal Conductance Based Control System to Avoid Droplet Formation at Nozzle 10

Figure 5:
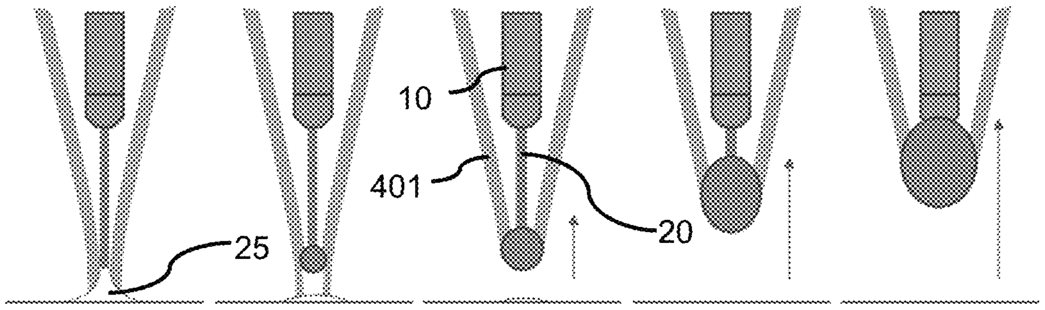
FIG. 5 is a schematic representation of the formation of a metal drop clogging a nozzle during an additive manufacturing process.

An LMD-w apparatus, CoaxPrinter from Precitec GmbH & Co, was configured to deposit two layers of material on a substrate 30. The deposition process was performed twice, first without any control of conductance, and second with conductance control according to the control system 500 described herein. A typical problem with an LMD-w, as described previously, is the formation of a droplet and the disconnection of the wire tip from the substrate 30. This problem is shown schematically in FIG. 5. The problem occurs because the droplet, due to its large size, absorbs the laser light (heat 301), further perpetuating the growth of the droplet.

Results

Figure 4A:
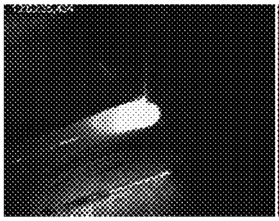
FIGS. 4*a-g* are frames from a recorded additive manufacturing process where the additive manufacturing apparatus comprises a control system according to an aspect, and where no metal drop forms.
Figure 4B:
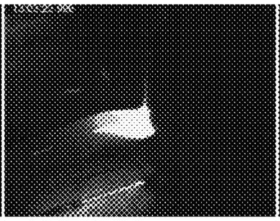
Figure 4C:
Figure 4D:
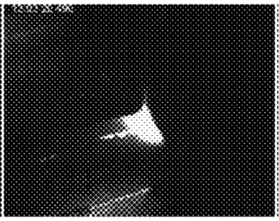
Figure 4E:
Figure 4F:
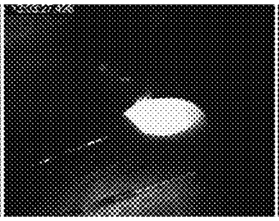
Figure 4G:
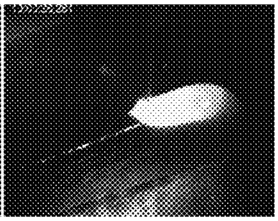

FIG. 3*a*-*g* shows a sequence of images taken from a video of the LMD-w process without the conductance based control system described herein. As can be seen in FIGS. 4*d* and 4*e* a droplet is formed at the tip of the wire which becomes disconnected from the substrate 30 and subsequently, due to surface tension forces, melts to the nozzle 10 tip. Such a droplet formation results in a failure of the deposition process and the process must be stopped.

FIG. 4*a*-*g* shows a sequence of images taken from a video of the LMD-w process with the conductance based control system 500 described herein. As can be seen, droplet formation is avoided by controlling for a nominal conductance. In particular, in the process shown in FIG. 4*a*-*g* the laser power (heat 301) was the main parameter controlled by the conductance based control system 500. The control of the laser power 301, that is the heat source 300, based on the measured conductance resulted in an improved process, without droplet formation and without failure.

Experiment 2: Deposition System Comprising Nominal Conductance Based Control of Several Process Parameters A deposition system consisting of an industrial 6-axis robot, a high power YAG fibre laser, a wire feeder, a linear actuator for positioning the wire tip and a control system 500 implemented in a PLC was used to deposit a cuboid geometry (25×25×150 mm). The material used was Alloy 718 which requires special consideration in terms of temperature history in order to achieve required material properties. These temperature considerations are accommodated by running a process with relatively low heat input. The downside of this is that the process stability is detrimentally affected by the relatively cold processing conditions, leading to a small process window for maintaining a sound process. Typically, the distance between the wire tip and the substrate 30 has to be kept within 0.2 mm from nominal in order to avoid drop material transfer or plunging of solid wire into solid substrate 30 (stubbing), causing defects. The control system 500 was configured to adjust each of wire tip position, wire feed rate and laser power in order to maintain nominal conductance.

Results

The control system 500 was able to mitigate disturbances and varying conditions due to e.g. warping of the substrate 30 and heat accumulation in a way an operator could not. Measurement and control was carried out with a frequency of 100 Hz, a rate at which a human cannot simultaneously control three actuators (linear actuator, wire feed rate and laser power). The linear actuator feedback control based on constant conductance ensured that the substrate 30 profile was followed and the wire feed control evened out any deviations from nominal height. The laser control prevented any build-up of droplets by decreasing the laser power if decreasing conductance was detected.

Without the control system it would be impossible to avoid droplet material transfer and wire plunging/stubbing given the narrow process window and the challenging process parameters. The resulting geometry would be of very poor quality both in terms of geometry and internal defects.

The present disclosure has described a control system 500 for an additive manufacturing apparatus and processes for controlling an additive manufacturing apparatus. In some aspects, the control system 500 may form a component of an additive manufacturing system, that is an additive manufacturing system may comprise the control system 500 described herein. An additive manufacturing apparatus may be provided separately to the control system 500, in which case the control system 500 may form a separate component which is connectable to an existing additive manufacturing apparatus. Alternatively, an additive manufacturing apparatus may be provided with the control system 500 in-built.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. An additive manufacturing apparatus that adds metal to a substrate by means of metal deposition, wherein the additive manufacturing apparatus comprises:

a nozzle for output of a metal strip, the nozzle configured to be arranged at a distance from the substrate and configured to move relative the substrate in XYZ-axes via a position actuator;

a heat source configured to melt the metal strip into a weld pool on the substrate;

an electrical power source configured to supply a current via the metal strip to the substrate; and a control system that:

determines an electrical conductance between the metal strip and the substrate by measuring at least one electrical property of the supplied current;

determines a difference between the determined electrical conductance and a desired electrical conductance; and adjust, based on the difference between the determined electrical conductance and the desired electrical conductance at least one of: a substrate to nozzle distance, a speed of movement of the nozzle relative to the substrate, an amount of supplied current, a heat provided by the heat source, and a rate of output of the metal strip.

2. The additive manufacturing apparatus according to claim 1, wherein the control system is configured to adjust at least one of the speed of nozzle movement relative the substrate, the amount of supplied current or the heat provided by the heat source.

3. The additive manufacturing apparatus according to claim 1, wherein the control system comprises at least one controller implementation such as P, PI, or PID; bang-bang; sliding mode; excitation signal; control system configured to maintain the desired conductance based on the measured conductance.

4. The additive manufacturing apparatus according to claim 1, wherein the control system is configured to adjust at least two of: the substrate to nozzle distance, the speed of the nozzle movement relative the substrate, the amount of supplied current, the heat provided by the heat source, and/or the rate of output of the metal strip, based on the difference between the determined conductance and the desired conductance.

5. The additive manufacturing apparatus according to claim 1, wherein the control system is configured to adjust the heat provided by the heat source, and optionally, additionally one of: the substrate to nozzle distance, the speed of the nozzle movement relative the substrate, the amount of supplied current, the rate of output of the metal strip; based on the difference between the determined conductance and the desired conductance.

6. The additive manufacturing apparatus according to claim 1, wherein the heat source of the additive manufacturing apparatus is a laser, an electric arc, a plasma, resistive heater, inductive heater, a flame, or an electron beam.

7. The additive manufacturing apparatus according to claim 1, wherein the electrical property comprises an electrical potential at a first position and an electrical potential at a second position, the first position being the nozzle, or a position on the metal strip at a distance from the substrate, and the second position being one of the substrate or ground.

8. The additive manufacturing apparatus according to claim 1, comprises comprising a current sensor configured to measure the electrical current.

9. A process for maintaining process stability of an additive manufacturing apparatus, wherein the apparatus comprises:

a nozzle for output of a metal strip, the nozzle configured to be arranged at a distance from a substrate and configured to move relative the substrate in XYZ-axes, a heat source configured to melt the metal strip into a weld pool on the substrate, and an electrical power source configured to supply a current via the metal strip to the substrate;

wherein the process comprises:

depositing, by the nozzle, a layer of metal including the metal strip;

determining an electrical conductance between the metal strip and the substrate by measuring at least one electrical property of the supplied current;

determining a difference between the electrical conductance between the metal strip and the substrate and a desired electrical conductance; and adjusting, based on the difference between the electrical conductance between the metal strip and the substrate and the desired electrical conductance, at least one of: a substrate to nozzle distance, a speed of movement of the nozzle relative the substrate, an amount of supplied current, a heat provided by the heat source, and a rate of output of the metal strip.

10. The process according to claim 9, wherein the process comprises adjusting at least one of: speed of nozzle movement relative the substrate, the amount of supplied current and the heat provided by the heat source.

11. The process according to claim 9, wherein the process comprises adjusting at least two of: the substrate to nozzle distance, the speed of the nozzle movement relative the substrate, the amount of supplied current, the heat provided by the heat source, and/or the rate of output of the metal strip, based on the difference between the determined conductance and the desired conductance.

12. The process according to claim 9, wherein the process comprises adjusting the heat provided by the heat source, and optionally, additionally adjusting one of: the substrate to nozzle distance, the speed of the nozzle movement relative the substrate, the amount of supplied current, the rate of output of the metal strip; based on the difference between the determined conductance and the desired conductance.

13. The process according to claim 9, wherein the process comprises depositing metal on the substrate via melting.

14. The process according to claim 9, wherein the process comprises determining the desired, nominal, conductance based on the deposition of an trial layer and comparing the measured conductance during deposition of the trial layer, to the process stability, and thereafter selecting a desired, nominal conductance based on the measured conductance when the process was observed as stable, or ideal.

15. An additive manufacturing apparatus for adding metal to a substrate by means of metal deposition, wherein the apparatus comprises:

a nozzle for output of a metal strip, the nozzle configured to be arranged at a distance from the substrate, and configured to move relative the substrate in XYZ-axes, a heat source configured to melt the metal strip into a weld pool on the substrate, and an electrical power source configured to supply current via the metal strip to the substrate; and, wherein the additive manufacturing apparatus comprises a control system configured to:

determine an electrical conductance between the metal strip and the substrate by measuring at least one electrical property of the supplied current;

determine a difference between the electrical conductance between the metal strip and the substrate and a desired electrical conductance; and adjust, based on the difference between the electrical conductance between the metal strip and the substrate and the desired electrical conductance, at least one of: a substrate to nozzle distance, a speed of movement of the nozzle relative the substrate, an amount of supplied current, a heat provided by the heat source, and a rate of output of the metal strip.

16. The additive manufacturing apparatus according to claim 15, wherein the control system of the apparatus is configured to adjust at least one of the speed of nozzle movement relative the substrate, the amount of supplied current, and the heat provided by the heat source.

17. The additive manufacturing apparatus according to claim 15, wherein the control system of the apparatus is configured to adjust at least two of: the substrate to nozzle distance, the speed of the nozzle movement relative the substrate, the amount of supplied current, the heat provided by the heat source, and the rate of output of the metal strip, based on the difference between the determined conductance and the desired conductance.

18. The additive manufacturing apparatus according to claim 15, wherein the control system is configured to adjust the heat provided by the heat source, and optionally, additionally one of: the substrate to nozzle distance, the speed of the nozzle movement relative the substrate, the amount of supplied current, the rate of output of the metal strip; based on the difference between the determined conductance and the desired conductance.

19. The additive manufacturing apparatus according to claim 15, wherein the apparatus comprises a current sensor configured to measure the at least one electrical property.

* * * * *